(12) United States Patent
Wojcik

(10) Patent No.: US 9,231,879 B1
(45) Date of Patent: Jan. 5, 2016

(54) METHODS FOR POLICY-BASED NETWORK TRAFFIC QUEUE MANAGEMENT AND DEVICES THEREOF

(75) Inventor: Frank Wojcik, Seattle, WA (US)

(73) Assignee: F5 Networks, Inc., Seattle, WA (US)

( * ) Notice: Subject to any disclaimer, the term of this patent is extended or adjusted under 35 U.S.C. 154(b) by 960 days.

(21) Appl. No.: 13/400,186

(22) Filed: Feb. 20, 2012

(51) Int. Cl.
*G06F 15/16* (2006.01)
*H04L 12/823* (2013.01)
*H04L 12/815* (2013.01)

(52) U.S. Cl.
CPC .............. *H04L 47/32* (2013.01); *H04L 47/22* (2013.01)

(58) Field of Classification Search
USPC .......................... 709/203, 207, 202, 224, 232
See application file for complete search history.

(56) References Cited

U.S. PATENT DOCUMENTS

| | | |
|---|---|---|
| 3,950,735 A | 4/1976 | Patel |
| 4,644,532 A | 2/1987 | George et al. |
| 4,897,781 A | 1/1990 | Chang et al. |
| 4,965,772 A | 10/1990 | Daniel et al. |
| 5,023,826 A | 6/1991 | Patel |
| 5,053,953 A | 10/1991 | Patel |
| 5,167,024 A | 11/1992 | Smith et al. |
| 5,299,312 A | 3/1994 | Rocco, Jr. |
| 5,327,529 A | 7/1994 | Fults et al. |
| 5,367,635 A | 11/1994 | Bauer et al. |
| 5,371,852 A | 12/1994 | Attanasio et al. |
| 5,406,502 A | 4/1995 | Haramaty et al. |
| 5,475,857 A | 12/1995 | Dally |
| 5,517,617 A | 5/1996 | Sathaye et al. |
| 5,519,694 A | 5/1996 | Brewer et al. |
| 5,519,778 A | 5/1996 | Leighton et al. |
| 5,521,591 A | 5/1996 | Arora et al. |
| 5,528,701 A | 6/1996 | Aref |
| 5,581,764 A | 12/1996 | Fitzgerald et al. |
| 5,596,742 A | 1/1997 | Agarwal et al. |
| 5,606,665 A | 2/1997 | Yang et al. |
| 5,611,049 A | 3/1997 | Pitts |
| 5,663,018 A | 9/1997 | Cummings et al. |
| 5,752,023 A | 5/1998 | Choucri et al. |
| 5,761,484 A | 6/1998 | Agarwal et al. |
| 5,768,423 A | 6/1998 | Aref et al. |
| 5,774,660 A | 6/1998 | Brendel et al. |

(Continued)

FOREIGN PATENT DOCUMENTS

| | | |
|---|---|---|
| EP | 0744850 A2 | 11/1996 |
| WO | 9114326 | 9/1991 |

(Continued)

OTHER PUBLICATIONS

F5 Networks Inc., "Configuration Guide for Local Traffic Management," F5 Networks Inc., Jan. 2006, version 9.2.2, 406 pgs.

(Continued)

*Primary Examiner* — David Lazaro
(74) *Attorney, Agent, or Firm* — LeClairRyan, a Professional Corporation

(57) ABSTRACT

A method, computer readable medium, and network traffic management apparatus includes determining whether at least one existing request should be removed from a request queue. At least one existing request stored in the request queue is identified by applying one or more queue management rules. The identified existing request is removed from the request queue and the current request is added to the request queue when it is determined that at least one existing request should be removed from the request queue.

21 Claims, 2 Drawing Sheets

(56) References Cited

U.S. PATENT DOCUMENTS

| | | |
|---|---|---|
| 5,790,554 A | 8/1998 | Pitcher et al. |
| 5,802,052 A | 9/1998 | Venkataraman |
| 5,812,550 A | 9/1998 | Sohn et al. |
| 5,825,772 A | 10/1998 | Dobbins et al. |
| 5,832,283 A | 11/1998 | Chou et al. |
| 5,875,296 A | 2/1999 | Shi et al. |
| 5,892,914 A | 4/1999 | Pitts |
| 5,892,932 A | 4/1999 | Kim |
| 5,919,247 A | 7/1999 | Van Hoff et al. |
| 5,936,939 A | 8/1999 | Des Jardins et al. |
| 5,941,988 A | 8/1999 | Bhagwat et al. |
| 5,946,690 A | 8/1999 | Pitts |
| 5,949,885 A | 9/1999 | Leighton |
| 5,951,694 A | 9/1999 | Choquier et al. |
| 5,959,990 A | 9/1999 | Frantz et al. |
| 5,974,460 A | 10/1999 | Maddalozzo, Jr. et al. |
| 5,983,281 A | 11/1999 | Ogle et al. |
| 5,988,847 A | 11/1999 | McLaughlin et al. |
| 6,006,260 A | 12/1999 | Barrick, Jr. et al. |
| 6,006,264 A | 12/1999 | Colby et al. |
| 6,026,452 A | 2/2000 | Pitts |
| 6,028,857 A | 2/2000 | Poor |
| 6,051,169 A | 4/2000 | Brown et al. |
| 6,078,956 A | 6/2000 | Bryant et al. |
| 6,085,234 A | 7/2000 | Pitts et al. |
| 6,092,196 A | 7/2000 | Reiche |
| 6,108,703 A | 8/2000 | Leighton et al. |
| 6,111,876 A | 8/2000 | Frantz et al. |
| 6,128,279 A | 10/2000 | O'Neil et al. |
| 6,128,657 A | 10/2000 | Okanoya et al. |
| 6,160,874 A | 12/2000 | Dickerman et al. |
| 6,170,022 B1 | 1/2001 | Linville et al. |
| 6,178,423 B1 | 1/2001 | Douceur et al. |
| 6,182,139 B1 | 1/2001 | Brendel |
| 6,192,051 B1 | 2/2001 | Lipman et al. |
| 6,233,612 B1 | 5/2001 | Fruchtman et al. |
| 6,246,684 B1 | 6/2001 | Chapman et al. |
| 6,253,226 B1 | 6/2001 | Chidambaran et al. |
| 6,253,230 B1 | 6/2001 | Couland et al. |
| 6,263,368 B1 | 7/2001 | Martin |
| 6,289,012 B1 | 9/2001 | Harrington et al. |
| 6,298,380 B1 | 10/2001 | Coile et al. |
| 6,327,622 B1 | 12/2001 | Jindal et al. |
| 6,343,324 B1 | 1/2002 | Hubis et al. |
| 6,347,339 B1 | 2/2002 | Morris et al. |
| 6,360,270 B1 | 3/2002 | Cherkasova et al. |
| 6,374,300 B2 | 4/2002 | Masters |
| 6,396,833 B1 | 5/2002 | Zhang et al. |
| 6,430,562 B1 | 8/2002 | Kardos et al. |
| 6,434,081 B1 | 8/2002 | Johnson et al. |
| 6,480,476 B1 | 11/2002 | Willars |
| 6,484,261 B1 | 11/2002 | Wiegel |
| 6,490,624 B1 | 12/2002 | Sampson et al. |
| 6,510,135 B1 | 1/2003 | Almulhem et al. |
| 6,510,458 B1 | 1/2003 | Berstis et al. |
| 6,519,643 B1 | 2/2003 | Foulkes et al. |
| 6,601,084 B1 | 7/2003 | Bhaskaran et al. |
| 6,636,503 B1 | 10/2003 | Shiran et al. |
| 6,636,894 B1 | 10/2003 | Short et al. |
| 6,650,640 B1 | 11/2003 | Muller et al. |
| 6,650,641 B1 | 11/2003 | Albert et al. |
| 6,654,701 B2 | 11/2003 | Hatley |
| 6,661,802 B1 * | 12/2003 | Homberg et al. ............ 370/412 |
| 6,683,873 B1 | 1/2004 | Kwok et al. |
| 6,691,165 B1 | 2/2004 | Bruck et al. |
| 6,694,517 B1 | 2/2004 | James et al. |
| 6,708,187 B1 | 3/2004 | Shanumgam et al. |
| 6,718,380 B1 | 4/2004 | Mohaban et al. |
| 6,742,045 B1 | 5/2004 | Albert et al. |
| 6,751,663 B1 | 6/2004 | Farrell et al. |
| 6,754,228 B1 | 6/2004 | Ludwig |
| 6,760,775 B1 | 7/2004 | Anerousis et al. |
| 6,772,219 B1 | 8/2004 | Shobatake |
| 6,779,039 B1 | 8/2004 | Bommareddy et al. |
| 6,781,986 B1 | 8/2004 | Sabaa et al. |
| 6,798,777 B1 | 9/2004 | Ferguson et al. |
| 6,804,542 B1 | 10/2004 | Haartsen |
| 6,816,901 B1 | 11/2004 | Sitaraman et al. |
| 6,816,977 B2 | 11/2004 | Brakmo et al. |
| 6,829,238 B2 | 12/2004 | Tokuyo et al. |
| 6,868,082 B1 | 3/2005 | Allen, Jr. et al. |
| 6,876,629 B2 | 4/2005 | Beshai et al. |
| 6,876,654 B1 | 4/2005 | Hegde |
| 6,888,836 B1 | 5/2005 | Cherkasova |
| 6,928,082 B2 | 8/2005 | Liu et al. |
| 6,947,985 B2 | 9/2005 | Hegli et al. |
| 6,950,434 B1 | 9/2005 | Viswanath et al. |
| 6,954,780 B2 | 10/2005 | Susai et al. |
| 6,957,272 B2 | 10/2005 | Tallegas et al. |
| 6,959,394 B1 | 10/2005 | Brickell et al. |
| 6,975,592 B1 | 12/2005 | Seddigh et al. |
| 6,987,763 B2 | 1/2006 | Rochberger et al. |
| 7,007,092 B2 | 2/2006 | Peiffer |
| 7,058,633 B1 | 6/2006 | Gnagy et al. |
| 7,113,993 B1 | 9/2006 | Cappiello et al. |
| 7,133,944 B2 | 11/2006 | Song et al. |
| 7,139,792 B1 | 11/2006 | Mishra et al. |
| 7,228,422 B2 | 6/2007 | Morioka et al. |
| 7,283,470 B1 | 10/2007 | Sindhu et al. |
| 7,287,082 B1 | 10/2007 | O'Toole, Jr. |
| 7,295,827 B2 | 11/2007 | Liu et al. |
| 7,308,703 B2 | 12/2007 | Wright et al. |
| 7,308,709 B1 | 12/2007 | Brezak et al. |
| 7,310,339 B1 * | 12/2007 | Powers et al. ............ 370/394 |
| 7,321,926 B1 | 1/2008 | Zhang et al. |
| 7,333,999 B1 | 2/2008 | Njemanze |
| 7,343,413 B2 | 3/2008 | Gilde et al. |
| 7,349,391 B2 | 3/2008 | Ben-Dor et al. |
| 7,398,552 B2 | 7/2008 | Pardee et al. |
| 7,433,962 B2 | 10/2008 | Janssen et al. |
| 7,454,480 B2 | 11/2008 | Labio et al. |
| 7,490,162 B1 | 2/2009 | Masters |
| 7,500,243 B2 | 3/2009 | Huetsch et al. |
| 7,500,269 B2 | 3/2009 | Huotari et al. |
| 7,505,795 B1 | 3/2009 | Lim et al. |
| 7,516,492 B1 | 4/2009 | Nisbet et al. |
| 7,526,541 B2 | 4/2009 | Roese et al. |
| 7,558,197 B1 | 7/2009 | Sindhu et al. |
| 7,580,971 B1 | 8/2009 | Gollapudi et al. |
| 7,624,424 B2 | 11/2009 | Morita et al. |
| 7,644,137 B2 | 1/2010 | Bozak et al. |
| 7,668,166 B1 | 2/2010 | Rekhter et al. |
| 7,706,261 B2 | 4/2010 | Sun et al. |
| 7,724,657 B2 | 5/2010 | Rao et al. |
| 7,725,093 B2 | 5/2010 | Sengupta et al. |
| 7,778,187 B2 | 8/2010 | Chaturvedi et al. |
| 7,801,978 B1 | 9/2010 | Susai et al. |
| 7,831,662 B2 | 11/2010 | Clark et al. |
| 7,876,677 B2 | 1/2011 | Cheshire |
| 7,908,314 B2 | 3/2011 | Yamaguchi et al. |
| 7,925,908 B2 | 4/2011 | Kim |
| 7,933,946 B2 | 4/2011 | Livshits et al. |
| 7,945,908 B1 | 5/2011 | Waldspurger et al. |
| 7,984,141 B2 | 7/2011 | Gupta et al. |
| 8,103,781 B1 * | 1/2012 | Wu et al. ............ 709/227 |
| 8,130,650 B2 | 3/2012 | Allen, Jr. et al. |
| 8,199,757 B2 | 6/2012 | Pani et al. |
| 8,321,908 B2 | 11/2012 | Gai et al. |
| 8,351,333 B2 | 1/2013 | Rao et al. |
| 8,380,854 B2 | 2/2013 | Szabo |
| 8,417,817 B1 * | 4/2013 | Jacobs ............ 709/226 |
| 8,447,871 B1 | 5/2013 | Szabo |
| 8,464,265 B2 | 6/2013 | Worley |
| 8,606,921 B2 | 12/2013 | Vasquez et al. |
| 8,615,022 B2 | 12/2013 | Harrison et al. |
| 8,665,868 B2 | 3/2014 | Kay |
| 8,701,179 B1 | 4/2014 | Penno et al. |
| 8,778,665 B2 | 7/2014 | Gibbons et al. |
| 8,804,504 B1 | 8/2014 | Chen |
| 8,819,109 B1 | 8/2014 | Krishnamurthy et al. |
| 8,819,768 B1 | 8/2014 | Koeten et al. |
| 8,830,874 B2 | 9/2014 | Cho et al. |
| 2001/0009554 A1 | 7/2001 | Katseff et al. |
| 2001/0023442 A1 | 9/2001 | Masters |

(56) References Cited

U.S. PATENT DOCUMENTS

| | | |
|---|---|---|
| 2002/0049842 A1 | 4/2002 | Huetsch et al. |
| 2002/0059428 A1 | 5/2002 | Susai et al. |
| 2002/0083067 A1 | 6/2002 | Tamayo et al. |
| 2002/0112061 A1* | 8/2002 | Shih et al. .................... 709/229 |
| 2002/0138615 A1 | 9/2002 | Schmeling |
| 2002/0161913 A1 | 10/2002 | Gonzalez et al. |
| 2002/0188753 A1 | 12/2002 | Tang et al. |
| 2002/0194342 A1 | 12/2002 | Lu et al. |
| 2002/0198993 A1 | 12/2002 | Cudd et al. |
| 2003/0037070 A1 | 2/2003 | Marston |
| 2003/0046291 A1 | 3/2003 | Fascenda |
| 2003/0065951 A1 | 4/2003 | Igeta et al. |
| 2003/0069918 A1 | 4/2003 | Lu et al. |
| 2003/0069974 A1 | 4/2003 | Lu et al. |
| 2003/0070069 A1 | 4/2003 | Belapurkar et al. |
| 2003/0086415 A1 | 5/2003 | Bernhard et al. |
| 2003/0105983 A1 | 6/2003 | Brakmo et al. |
| 2003/0108052 A1 | 6/2003 | Inoue et al. |
| 2003/0120948 A1 | 6/2003 | Schmidt et al. |
| 2003/0128708 A1 | 7/2003 | Inoue et al. |
| 2003/0145062 A1 | 7/2003 | Sharma et al. |
| 2003/0145233 A1 | 7/2003 | Poletto et al. |
| 2003/0163576 A1 | 8/2003 | Janssen et al. |
| 2003/0225485 A1 | 12/2003 | Fritz et al. |
| 2004/0003287 A1 | 1/2004 | Zissimopoulos et al. |
| 2004/0072569 A1 | 4/2004 | Omae et al. |
| 2004/0103283 A1 | 5/2004 | Hornak |
| 2004/0111523 A1 | 6/2004 | Hall et al. |
| 2004/0111621 A1 | 6/2004 | Himberger et al. |
| 2004/0117493 A1 | 6/2004 | Bazot et al. |
| 2004/0151186 A1 | 8/2004 | Akama |
| 2004/0192312 A1 | 9/2004 | Li et al. |
| 2004/0199762 A1 | 10/2004 | Carlson et al. |
| 2004/0264472 A1 | 12/2004 | Oliver et al. |
| 2004/0264481 A1 | 12/2004 | Darling et al. |
| 2004/0267920 A1 | 12/2004 | Hydrie et al. |
| 2004/0267948 A1 | 12/2004 | Oliver et al. |
| 2004/0268358 A1 | 12/2004 | Darling et al. |
| 2005/0004887 A1 | 1/2005 | Igakura et al. |
| 2005/0021736 A1 | 1/2005 | Carusi et al. |
| 2005/0027869 A1 | 2/2005 | Johnson |
| 2005/0044213 A1 | 2/2005 | Kobayashi et al. |
| 2005/0052440 A1 | 3/2005 | Kim et al. |
| 2005/0055435 A1 | 3/2005 | Gbadegesin et al. |
| 2005/0078604 A1 | 4/2005 | Yim |
| 2005/0122977 A1 | 6/2005 | Lieberman |
| 2005/0154837 A1 | 7/2005 | Keohane et al. |
| 2005/0187866 A1 | 8/2005 | Lee |
| 2005/0188220 A1 | 8/2005 | Nilsson et al. |
| 2005/0198310 A1 | 9/2005 | Kim et al. |
| 2005/0262238 A1 | 11/2005 | Reeves et al. |
| 2006/0031520 A1 | 2/2006 | Bedekar et al. |
| 2006/0036764 A1* | 2/2006 | Yokota et al. .................. 709/240 |
| 2006/0059267 A1 | 3/2006 | Cugi et al. |
| 2006/0077902 A1 | 4/2006 | Kannan et al. |
| 2006/0077986 A1 | 4/2006 | Rune |
| 2006/0112176 A1 | 5/2006 | Liu et al. |
| 2006/0112272 A1 | 5/2006 | Morioka et al. |
| 2006/0129684 A1 | 6/2006 | Datta |
| 2006/0135198 A1 | 6/2006 | Lee |
| 2006/0156416 A1 | 7/2006 | Huotari et al. |
| 2006/0161577 A1 | 7/2006 | Kulkarni et al. |
| 2006/0171365 A1 | 8/2006 | Borella |
| 2006/0184647 A1 | 8/2006 | Dixit et al. |
| 2006/0209853 A1 | 9/2006 | Hidaka et al. |
| 2006/0230148 A1 | 10/2006 | Forecast et al. |
| 2006/0233106 A1 | 10/2006 | Achlioptas et al. |
| 2006/0242300 A1 | 10/2006 | Yumoto et al. |
| 2006/0268704 A1* | 11/2006 | Ansari et al. .................. 370/230 |
| 2007/0006293 A1 | 1/2007 | Balakrishnan et al. |
| 2007/0016662 A1 | 1/2007 | Desai et al. |
| 2007/0058670 A1 | 3/2007 | Konduru et al. |
| 2007/0064661 A1 | 3/2007 | Sood et al. |
| 2007/0083646 A1 | 4/2007 | Miller et al. |
| 2007/0088822 A1 | 4/2007 | Coile et al. |
| 2007/0106796 A1 | 5/2007 | Kudo et al. |
| 2007/0107048 A1 | 5/2007 | Halls et al. |
| 2007/0118879 A1 | 5/2007 | Yeun |
| 2007/0174491 A1 | 7/2007 | Still et al. |
| 2007/0220598 A1 | 9/2007 | Salowey et al. |
| 2007/0233809 A1 | 10/2007 | Brownell et al. |
| 2007/0297410 A1 | 12/2007 | Yoon et al. |
| 2007/0297551 A1 | 12/2007 | Choi |
| 2008/0025297 A1 | 1/2008 | Kashyap |
| 2008/0031258 A1* | 2/2008 | Acharya et al. .......... 370/395.42 |
| 2008/0034136 A1 | 2/2008 | Ulenas |
| 2008/0072303 A1 | 3/2008 | Syed |
| 2008/0120370 A1 | 5/2008 | Chan et al. |
| 2008/0133518 A1 | 6/2008 | Kapoor et al. |
| 2008/0134311 A1 | 6/2008 | Medvinsky et al. |
| 2008/0148340 A1 | 6/2008 | Powell et al. |
| 2008/0159145 A1 | 7/2008 | Muthukrishnan et al. |
| 2008/0178278 A1 | 7/2008 | Grinstein et al. |
| 2008/0201599 A1 | 8/2008 | Ferraiolo et al. |
| 2008/0205613 A1 | 8/2008 | Lopez |
| 2008/0222646 A1 | 9/2008 | Sigal et al. |
| 2008/0225710 A1 | 9/2008 | Raja et al. |
| 2008/0229415 A1 | 9/2008 | Kapoor et al. |
| 2008/0253395 A1 | 10/2008 | Pandya |
| 2008/0256224 A1 | 10/2008 | Kaji et al. |
| 2008/0279200 A1 | 11/2008 | Shatzkamer et al. |
| 2008/0282354 A1 | 11/2008 | Wobber et al. |
| 2008/0288661 A1 | 11/2008 | Galles |
| 2008/0301760 A1 | 12/2008 | Lim |
| 2009/0028337 A1 | 1/2009 | Balabine et al. |
| 2009/0049230 A1 | 2/2009 | Pandya |
| 2009/0070617 A1 | 3/2009 | Arimilli et al. |
| 2009/0077619 A1 | 3/2009 | Boyce |
| 2009/0094610 A1 | 4/2009 | Sukirya |
| 2009/0119504 A1 | 5/2009 | van Os et al. |
| 2009/0125496 A1 | 5/2009 | Wexler et al. |
| 2009/0125532 A1 | 5/2009 | Wexler et al. |
| 2009/0125625 A1 | 5/2009 | Shim et al. |
| 2009/0138749 A1 | 5/2009 | Moll et al. |
| 2009/0141891 A1 | 6/2009 | Boyen et al. |
| 2009/0157678 A1 | 6/2009 | Turk |
| 2009/0193513 A1 | 7/2009 | Agarwal et al. |
| 2009/0196282 A1 | 8/2009 | Fellman et al. |
| 2009/0228956 A1 | 9/2009 | He et al. |
| 2009/0287935 A1 | 11/2009 | Aull et al. |
| 2009/0296624 A1 | 12/2009 | Ryu et al. |
| 2009/0300407 A1 | 12/2009 | Kamath et al. |
| 2010/0011434 A1 | 1/2010 | Kay |
| 2010/0023582 A1 | 1/2010 | Pedersen et al. |
| 2010/0071048 A1 | 3/2010 | Novak et al. |
| 2010/0115236 A1 | 5/2010 | Bataineh et al. |
| 2010/0122091 A1 | 5/2010 | Huang et al. |
| 2010/0150154 A1 | 6/2010 | Viger et al. |
| 2010/0154031 A1 | 6/2010 | Montemurro et al. |
| 2010/0165877 A1 | 7/2010 | Shukla et al. |
| 2010/0188976 A1 | 7/2010 | Rahman et al. |
| 2010/0189052 A1 | 7/2010 | Kavanagh et al. |
| 2010/0242092 A1 | 9/2010 | Harris et al. |
| 2010/0251330 A1 | 9/2010 | Kroeselberg et al. |
| 2010/0279733 A1 | 11/2010 | Karsten et al. |
| 2010/0299451 A1 | 11/2010 | Yigang et al. |
| 2010/0322250 A1 | 12/2010 | Shetty et al. |
| 2010/0325277 A1 | 12/2010 | Muthiah et al. |
| 2011/0040889 A1 | 2/2011 | Garrett et al. |
| 2011/0047620 A1 | 2/2011 | Mahaffey et al. |
| 2011/0066718 A1 | 3/2011 | Susai et al. |
| 2011/0107077 A1 | 5/2011 | Henderson et al. |
| 2011/0153822 A1 | 6/2011 | Rajan et al. |
| 2011/0154443 A1 | 6/2011 | Thakur et al. |
| 2011/0173295 A1 | 7/2011 | Bakke et al. |
| 2011/0184733 A1 | 7/2011 | Yu et al. |
| 2011/0202676 A1 | 8/2011 | Craig et al. |
| 2011/0246800 A1 | 10/2011 | Accpadi et al. |
| 2011/0273984 A1 | 11/2011 | Hsu et al. |
| 2011/0282997 A1 | 11/2011 | Prince et al. |
| 2011/0314178 A1 | 12/2011 | Kanode et al. |
| 2011/0321122 A1 | 12/2011 | Mwangi et al. |
| 2012/0016994 A1 | 1/2012 | Nakamura et al. |
| 2012/0039341 A1 | 2/2012 | Latif et al. |

(56) References Cited

U.S. PATENT DOCUMENTS

| | | | |
|---|---|---|---|
| 2012/0041965 A1 | 2/2012 | Vasquez et al. | |
| 2012/0063314 A1 | 3/2012 | Pignataro et al. | |
| 2012/0066489 A1 | 3/2012 | Ozaki et al. | |
| 2012/0101952 A1 | 4/2012 | Raleigh et al. | |
| 2012/0191847 A1 | 7/2012 | Nas et al. | |
| 2012/0224531 A1 | 9/2012 | Karuturi et al. | |
| 2012/0311153 A1 | 12/2012 | Morgan | |
| 2012/0317266 A1 | 12/2012 | Abbott | |
| 2013/0029726 A1* | 1/2013 | Berionne et al. | 455/558 |
| 2013/0031060 A1* | 1/2013 | Lowery et al. | 707/689 |
| 2013/0091002 A1 | 4/2013 | Christie et al. | |
| 2013/0198322 A1* | 8/2013 | Oran et al. | 709/217 |
| 2013/0205361 A1 | 8/2013 | Oran et al. | |
| 2013/0336122 A1 | 12/2013 | Baruah et al. | |
| 2014/0040478 A1 | 2/2014 | Hsu et al. | |
| 2014/0059678 A1 | 2/2014 | Parker | |
| 2014/0095661 A1 | 4/2014 | Knowles et al. | |
| 2014/0162705 A1* | 6/2014 | De Wit et al. | 455/458 |
| 2014/0171089 A1 | 6/2014 | Janakiraman et al. | |
| 2014/0269484 A1* | 9/2014 | Dankberg et al. | 370/312 |
| 2014/0317404 A1 | 10/2014 | Carlson et al. | |

FOREIGN PATENT DOCUMENTS

| | | |
|---|---|---|
| WO | 9505712 | 2/1995 |
| WO | 9709805 | 3/1997 |
| WO | 9745800 | 12/1997 |
| WO | 9905829 | 2/1999 |
| WO | 9906913 | 2/1999 |
| WO | 9910858 | 3/1999 |
| WO | 9939373 | 8/1999 |
| WO | 9964967 | 12/1999 |
| WO | 0004422 | 1/2000 |
| WO | 0004458 | 1/2000 |

OTHER PUBLICATIONS

Crescendo Networks, "Application Layer Processing (ALP)," 2003-2009, pp. 168-186, Chapter 9, CN-5000E/5500E, Foxit Software Company.

"A Process for Selective Routing of Servlet Content to Transcoding Modules," Research Disclosure 422124, Jun. 1999, pp. 889-890, IBM Corporation.

"BIG-IP Controller with Exclusive OneConnect Content Switching Feature Provides a Breakthrough System for Maximizing Server and Network Performance," F5 Networks, Inc. Press Release, May 8, 2001, 2 pages, Las Vegas, Nevada.

Fielding et al., "Hypertext Transfer Protocol—HTTP/1.1," Network Working Group, RFC: 2068, Jan. 1997, pp. 1-162.

Fielding et al., "Hypertext Transfer Protocol—HTTP/1.1," Network Working Group, RFC: 2616, Jun. 1999, pp. 1-176.

Floyd et al., "Random Early Detection Gateways for Congestion Avoidance," Aug. 1993, pp. 1-22, IEEE/ACM Transactions on Networking, California.

Hochmuth, Phil, "F5, CacheFlow pump up content-delivery lines," Network World Fusion, May 4, 2001, 1 page, Las Vegas, Nevada.

"Servlet/Applet/HTML Authentication Process With Single Sign-On," Research Disclosure 429128, Jan. 2000, pp. 163-164, IBM Corporation.

"Traffic Surges; Surge Queue; Netscaler Defense," 2005, PowerPoint Presentation, slides 1-12, Citrix Systems, Inc.

Abad, C., et al., "An Analysis on the Schemes for Detecting and Preventing ARP Cache Poisoning Attacks", IEEE, Computer Society, 27th International Conference on Distributed Computing Systems Workshops (ICDCSW'07), 2007, pp. 1-8.

Owasp, "Testing for Cross site scripting", OWASP Testing Guide v2, Table of Contents, Feb. 24, 2011, pp. 1-5, (www.owasp.org/index.php/Testing_for_Cross_site_scripting).

International Search Report and The Written Opinion, for International Patent Application No. PCT/US2013/026615, Date of Mailing: Jul. 4, 2013.

Mac Vittie, L., "Message-Based Load Balancing: Using F5 solutions to address the challenges of scaling Diameter, Radius, and message-oriented protocols", F5 Technical Brief, 2005, pp. 1-9, F5 Networks Inc., Seattle, Washington.

International Search Report and The Written Opinion, for International Patent Application No. PCT/US2011/058469, Date of Mailing: Oct. 3, 2015.

* cited by examiner

METHODS FOR POLICY-BASED NETWORK TRAFFIC QUEUE MANAGEMENT AND DEVICES THEREOF

FIELD

This technology relates to managing network traffic resulting from client requests for content hosted by one or more networked servers and, more particularly, to methods and devices for policy-based network traffic queue management.

BACKGROUND

Queues are utilized to manage network traffic, such as transmission control protocol (TCP) packet and HTTP request communications. When server utilization is high and the communications would otherwise be dropped, queues can maintain the network communications for servicing at some later time.

A technique often employed to manage queues is random early drop (RED) which includes weighted RED, robust RED, and adaptive RED, for example. RED techniques generally provide for random removal of queue contents upon reaching a threshold queue utilization level below full queue utilization and then insertion of the current communication at the end of the queue. Generally, RED techniques implement a more balanced policy than dropping all incoming current communications upon full utilization of the queue, which can penalize clients disproportionally, including those clients sending relatively recent communications. Additionally, by dropping communications before the queue becomes full, RED techniques enable clients to become aware of the congestion and initiate steps to reduce transmission of communications, thereby potentially mitigating communication loss.

RED techniques are relatively effective for managing queues of TCP packets because TCP packets are automatically retransmitted when dropped, include a relatively small amount of data, and contain data that does not include references to other content and which would result in further communications. Additionally, RED techniques mitigate global TCP synchronization issues whereby several clients increase and decrease the rate of TCP packet retransmission at the same time, in response to packet loss, resulting in further congestion and packet loss.

However, RED techniques are relatively ineffective for managing queues of HTTP requests because HTTP requests are not automatically retransmitted, HTTP request loss is permanent, requiring manual retransmission by a user of the client computing device, and global synchronization is not a concern. Additionally, HTTP requests can reference content representing a substantial amount of data (e.g. an entire Web page). Further, HTTP requests for content containing references to other content (e.g. a hypertext markup language (HTML) document referencing embedded media) are not identified or differentiated by RED techniques, and randomly dropping such requests can unnecessarily multiply request and data loss.

SUMMARY

A method for policy-based network traffic queue management includes determining with a network traffic management apparatus whether at least one existing request should be removed from a request queue. At least one existing request stored in the request queue is identified by applying with a network traffic management apparatus one or more queue management rules. The identified existing request is removed from the request queue and the current request is added to the request queue when it is determined with a network traffic management apparatus that at least one existing request should be removed from the request queue.

A non-transitory computer readable medium having stored thereon instructions for policy-based network traffic queue management comprising machine executable code which when executed by at least one processor, causes the processor to perform steps including determining whether at least one existing request should be removed from a request queue. At least one existing request stored in the request queue is identified by applying one or more queue management rules. The identified existing request is removed from the request queue and the current request is added to the request queue when it is determined that at least one existing request should be removed from the request queue A network traffic management apparatus includes at least one of configurable hardware logic configured to be capable of implementing and a processor coupled to a memory and configured to execute programmed instructions stored in the memory including determining whether at least one existing request should be removed from a request queue. At least one existing request stored in the request queue is identified by applying one or more queue management rules. The identified existing request is removed from the request queue and the current request is added to the request queue when it is determined that at least one existing request should be removed from the request queue.

This technology provides a number of advantages including methods, non-transitory computer readable medium, and devices that reduce HTTP request loss by operating a request queue based on a queue management policy. With this technology, the policy is established based on a plurality of queue management rules configured to interpret one or more attributes of an HTTP request and to identify which existing HTTP requests should be dropped from the request queue when the network is congested, for example. As a result, management of HTTP requests is optimized to reduce loss in times of increased network congestion and/or server utilization, thereby improving the user experience.

DETAILED DESCRIPTION

Figure 1:
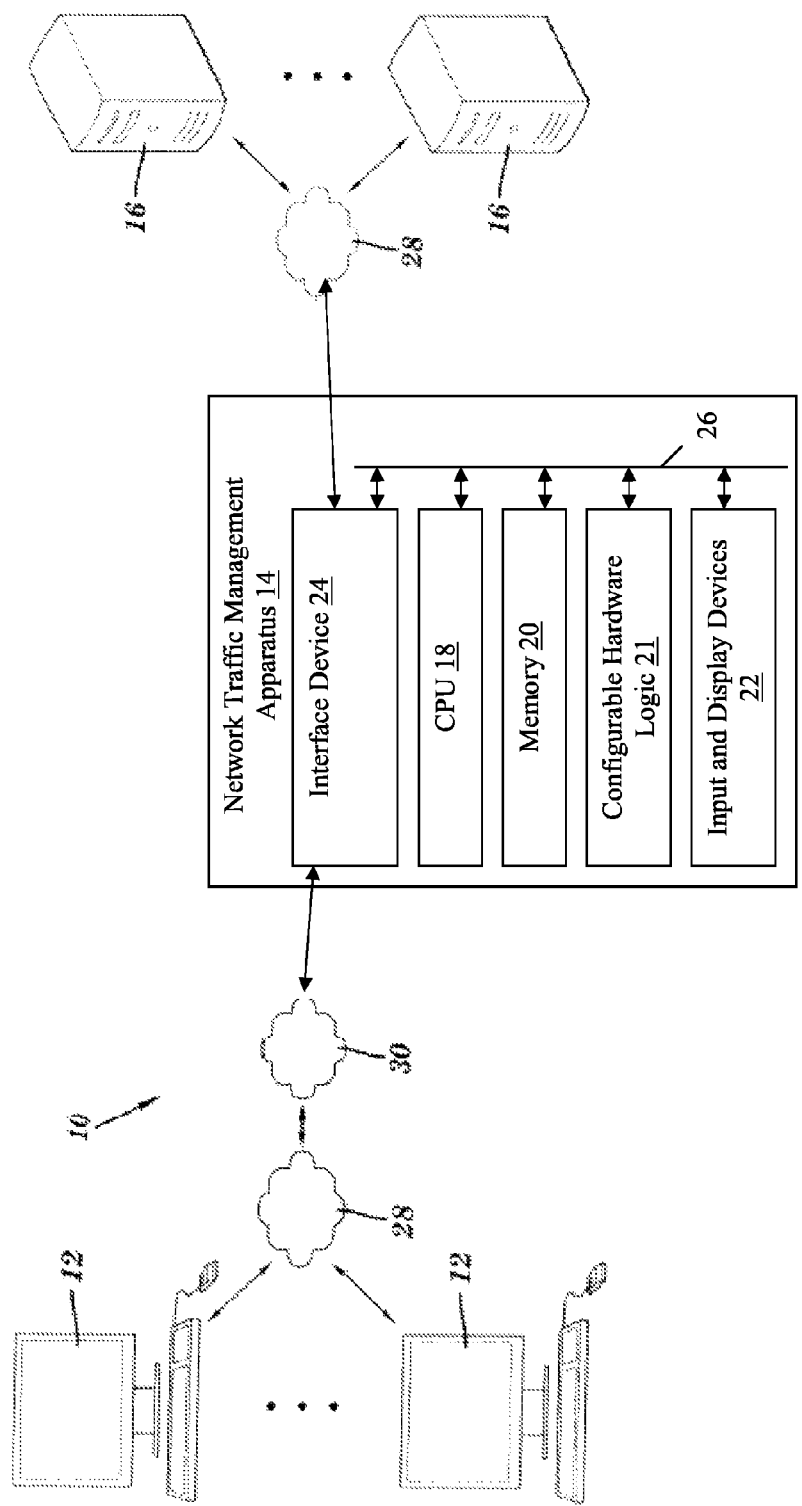
FIG. 1 is a block diagram of a network environment which incorporates an exemplary network traffic management apparatus for implementing policy-based network traffic queue management techniques.

A network environment 10 with an exemplary network traffic management apparatus 14 for implementing policy-based management of a network traffic queue is illustrated in FIG. 1. In this example, the environment 10 includes client computing devices 12, network traffic management apparatus 14, and servers 16, which are coupled together by local area networks (LAN) 28 and wide area network (WAN) 30, although other types and numbers of devices, components, and elements in other topologies could be used. While not shown, the environment 10 also may include additional network components, such as routers, switches and other devices, which are well known to those of ordinary skill in the art and thus will not be described here. This technology provides a number of advantages including methods, non-transitory computer readable medium, and apparatus that effectively manage one or more network traffic queues based on a policy as established by one or more queue management rules.

In this example, the network traffic management apparatus 14 is coupled to client computing devices 12 through one of the LANs 28, although the client computing devices 12, or other devices, and network traffic management apparatus 14 may be coupled together via other topologies. Additionally, the network traffic management apparatus 14 is coupled to the servers 16 through another one of the LANs 28, although the servers 16, or other devices, and the network traffic management apparatus 14 may be coupled together via other topologies. LANs 28 each may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like. The network traffic management apparatus 14 is further coupled to client computing devices 12 through WAN 30, which may comprise any wide area network (e.g., Internet), although any other type of traffic network topology may be used. Various network processing applications, such as CIFS applications, NFS applications, HTTP Web Server applications, and/or FTP applications, may be operating on servers 16 and transmitting data (e.g., files, Web pages) through the network traffic management apparatus 14 in response to requests for content from client computing devices 12.

The network traffic management apparatus 14 distributes manages one or more network traffic queues as illustrated and described with the examples herein, although network traffic management apparatus 14 may perform other types and numbers of functions, such as optimizing, securing and accelerating the traffic between client computing devices 12 and servers 16, and/or one or more applications. Network traffic management apparatus 14 includes at least one processor 18, memory 20, optional configurable hardware logic 21, I/O interface 22, and interface device 24 which are coupled together by bus 26, although network traffic management apparatus 14 may comprise other types and numbers of elements in other configurations. Although network traffic management apparatus 14 is shown in this example as being a standalone device, such as a BIG-IP® device offered by F5 Networks, Inc., of Seattle, Wash., it should be appreciated that the network traffic management apparatus 14 could also be one of several blades servers coupled to a chassis device, such as a VIPRION® device, also offered by F5 Networks, Inc., of Seattle, Wash.

Processor(s) 18 may execute one or more computer-executable instructions stored in the memory 20 for the methods illustrated and described with reference to the examples, although the processor(s) can execute other types and numbers of instructions and perform other types and numbers of operations. The processor(s) 18 may comprise one or more central processing units (CPUs) or general purpose processors with one or more processing cores, such as AMD® processor(s), although other types of processor(s) could be used (e.g., Intel®).

Figure 2:
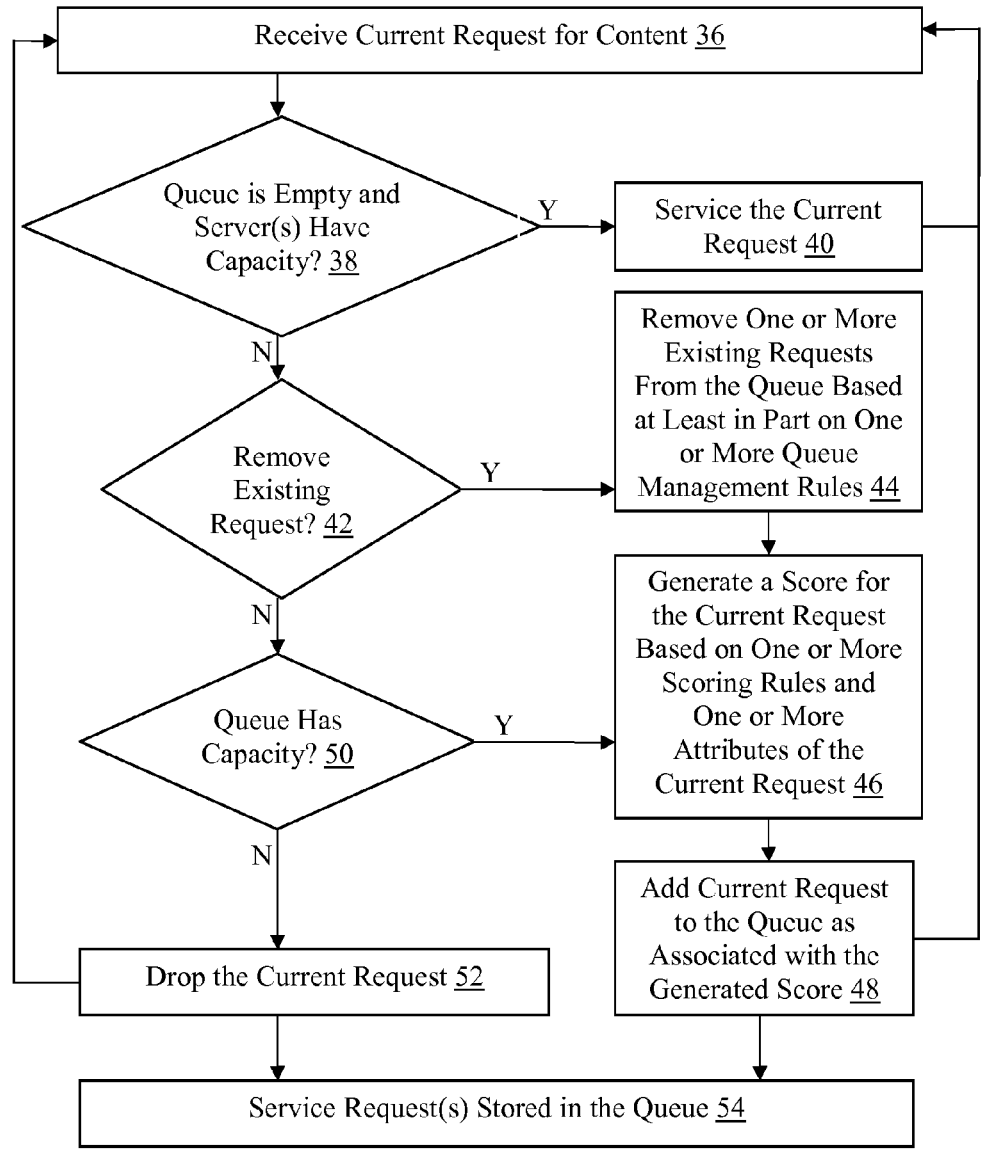
FIG. 2 is a flowchart of a method for policy-based network traffic queue management.

Memory 20 may comprise one or more tangible storage media, such as RAM, ROM, flash memory, CD-ROM, floppy disk, hard disk drive(s), solid state memory, DVD, or any other memory storage types or devices, including combinations thereof, which are known to those of ordinary skill in the art. Memory 20 may store one or more non-transitory computer-readable instructions of this technology as illustrated and described with reference to the examples herein that may be executed by the one or more processor(s) 18. The flow chart shown in FIG. 2 is representative of example steps or actions of this technology that may be embodied or expressed as one or more non-transitory computer or machine readable instructions stored in memory 20 that may be executed by the processor(s) 18 and/or may be implemented by configured logic in optional configurable hardware logic 21.

The optional configurable hardware logic 21 may comprise specialized hardware configured to implement one or more steps of this technology as illustrated and described with reference to the examples herein. By way of example only, the optional configurable hardware logic 21 may comprise one or more of field programmable gate arrays (FPGAs), field programmable logic devices (FPLDs), application specific integrated circuits (ASICs) and/or programmable logic units (PLUs).

Input and display devices 22 enable a user, such as an administrator, to interact with the network traffic management apparatus 14, such as to input and/or view data and/or to configure, program and/or operate it by way of example only. Input devices may include a keyboard and/or a computer mouse and display devices may include a computer monitor, although other types and numbers of input devices and display devices could be used.

The interface device 24 in the network traffic management apparatus 14 is used to operatively couple and communicate between the network traffic management apparatus 14 and the client computing devices 12 and the servers 16, which are all coupled together by one or more local area networks (LAN) 28 and wide area networks (WAN) 30, although other types and numbers of communication networks or systems with other types and numbers of connections and configurations to other devices and elements. By way of example only, the local area networks (LAN) 28 and wide area networks (WAN) 30 can use TCP/IP over Ethernet and industry-standard protocols, including NFS, CIFS, SOAP, XML, LDAP, and SNMP, although other types and numbers of communication networks, can be used. In this example, the bus 26 is a hyper-transport bus in this example, although other bus types and links may be used, such as PCI.

Each of the client computing devices 12 and the servers 16 include a central processing unit (CPU) or processor, a memory, an interface device, and an I/O system, which are coupled together by a bus or other link, although other numbers and types of network devices could be used. The client computing devices 12, in this example, may run interface applications, such as Web browsers, that may provide an interface to make requests for and send content and/or data to different server-based applications via the LANs 28 and/or WANs 30.

Generally, servers 16 process requests received from requesting client computing devices 12 via LANs 28 and/or WANs 30 according to the HTTP-based application RFC protocol or the CIFS or NFS protocol in this example, but the principles discussed herein are not limited to this example and can include other application protocols. A series of applications may run on the servers 16 that allow the transmission of data, such as a data file or metadata, requested by the client computing devices 12. The servers 16 may provide data or receive data in response to requests directed toward the respective applications on the servers 16 from the client computing devices 12. It is to be understood that the servers 16 may be hardware or software or may represent a system with multiple servers 16 in a server pool, which may include internal or external networks. In this example the servers 16 may be any version of Microsoft® IIS servers or Apache® servers, although other types of servers may be used. Further, additional servers may be coupled to the LAN 28 and many different types of applications may be available on servers coupled to the LAN 28.

Although an exemplary network environment 10 with client computing devices 12, network traffic management apparatus 14, servers 16, LANs 28 and WANs 30 are described and illustrated herein, other types and numbers of systems, devices, blades, components, and elements in other topologies can be used. It is to be understood that the systems of the examples described herein are for exemplary purposes, as many variations of the specific hardware and software used to implement the examples are possible, as will be appreciated by those skilled in the relevant art(s).

Furthermore, each of the systems of the examples may be conveniently implemented using one or more general purpose computer systems, microprocessors, digital signal processors, and micro-controllers, programmed according to the teachings of the examples, as described and illustrated herein, and as will be appreciated by those of ordinary skill in the art.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic media, wireless traffic networks, cellular traffic networks, G3 traffic networks, Public Switched Telephone Network (PSTNs), Packet Data Networks (PDNs), the Internet, intranets, and combinations thereof.

The examples may also be embodied as a non-transitory computer readable medium having instructions stored thereon for one or more aspects of the technology as described and illustrated by way of the examples herein, which when executed by a processor (or configurable hardware), cause the processor to carry out the steps necessary to implement the methods of the examples, as described and illustrated herein.

An exemplary method for policy-based network traffic queue management will now be described with reference to FIGS. 1-2. In this particular example, in step 36, one of the client computing devices 12 initiates transmission of at least one current HTTP request for content which is received by the network traffic management apparatus 14, although other types and numbers of devices and systems could initiate the transmission.

At step 38, the network traffic management apparatus 14 determines whether a request queue maintained in the memory 20 of the network traffic management apparatus 14 is empty and whether any of the servers 16 has capacity to service the current request, although other types and numbers of aspects of the network traffic management apparatus 14 and/or servers 16 could be evaluated. Utilization of one or more of the servers 16 can be determined by the network traffic management apparatus 14 using a system management protocol, such as Windows™ management instrumentation (WMI) protocol and/or simple network management protocol (SNMP), maintaining a log of the number of requests currently being serviced by each of the servers 16, or any other method of analyzing utilization of the servers 16. By way of example, the network traffic management apparatus 14 can determine that a server 16 does not have capacity when a threshold CPU utilization level is reached, the threshold level being established by an administrator of the network traffic management apparatus 14, for example, and, optionally, being less than the full CPU capacity of the server 16. If in step 38 the network traffic management apparatus 14 determines the request queue is empty and at least one of the servers 16 has capacity to service the current request for content, then the Yes branch is taken to step 40. At step 40, the requested content is retrieved from one or more of the servers 16 and communicated through the network traffic management apparatus 14 to the requesting one of the client computing devices 12.

If in step 38 the network traffic management apparatus 14 determines none of the servers 16 has capacity or the request queue is not empty, then the No branch is taken to step 42. At step 42, the network traffic management apparatus 14 determines whether to drop one of the existing requests stored in the request queue by applying one or more queue management rules. In one example, the queue management rules are stored in the memory 20 of the network traffic management apparatus 14, although the queue management rules could be stored in other locations.

One exemplary queue management rule would require removal of at least one existing request from the request queue when the request queue is more than seventy percent utilized, although any number and type of queue management rule(s) for determining when an existing request should be removed from the request queue are possible and can be based on any number and type of request queue, server 16, and/or network characteristic(s).

If at step 42 the network traffic management apparatus 14 determines that at least one existing request should be removed from the queue, then the Yes branch is taken to step 44. At step 44, the network traffic management apparatus 14 removes an existing request from the queue as identified by the application of one or more queue management rules and, optionally, the score values associated with each of the existing requests in the request queue, as established by the application of one or more scoring rules as described in greater detail below, although other manners for removing an existing request could be used. Accordingly, one or more queue management rules can determine whether one or more existing requests should be removed from the request queue, at step 42, and/or which existing request(s) should be removed from the request queue, at step 44.

In one example, a queue management rule could require removal of the existing request for a hypertext markup language (HTML) web page document most recently inserted into the request queue when utilization of the request queue is more than ninety percent. In this example, the identified existing request is for a web page document likely to include references to other content and, therefore, to directly lead to further requests and additional network traffic, which is undesirable when network congestion is high. Other exemplary file types of requested content likely to lead to further requests include active server pages (ASP), PHP, and java server pages (JSP), for example.

However, another exemplary policy may place a relatively high importance on requests for web page documents and, accordingly, queue management rule(s) can be defined so as to identify, at step 44, existing requests for content other than web page documents to remove from the request queue prior to identifying any existing requests for web page documents. Accordingly, one exemplary queue management rule can require removal of an existing request for content having an MP3 extension and/or file type. Another exemplary queue management rule can identify for removal a request for content that is likely of a large size, such as determined with reference to a cache memory stored on the network traffic management apparatus 14, but not likely critical to proper web page display, when the request queue is less than fifty percent full and otherwise identify the request for content that has been in the request queue the longest.

The queue management rules can include rules established by a manufacturer of the traffic management apparatus 14 and/or rules configured by a administrator of the network traffic management apparatus 14, such as through an interface accessible by an event driven scripting language such as iRules® offered by F5 Networks, Inc., of Seattle, Wash., for example. Manufacturer and/or network administrator defined queue management rules can be defined based on one or more request attributes such as network address associated with a request, a user and/or client computing device 12 associated with a request, a type of the content associated with a request, whether servicing a request is likely to result in one or more related requests, a uniform resource identifier (URI) of the content associated with a request, one or more cookies associated with a request, information regarding the requested content stored in cache, one or more HTTP header values associated with a request, and/or any other request attribute, for example.

The queue management rules can also include rules learned by the traffic management apparatus 14 over time. In one example, the queue management rules are defined based on historical information regarding at least one or more users of client computing devices 12, one or more network addresses, and/or the requested content. In this example, the traffic management apparatus 14 can maintain performance information in the memory 20, such as the number of requests received from each user, the number of requests received from each network address, and/or the number of requests received for the same content, and can generate one or more queue management rules based on the performance information. In one example in which a disproportionately large number of existing requests stored in the queue originate from the same IP address, the network traffic management apparatus 14 can identify the increasing volume and generate a queue management rule that is configured to, when applied at step 44, identify an existing request associated with the IP address thereby facilitating removal of those requests from the request queue prior to all other existing requests, for example.

Accordingly, by applying one or more queue management rules, the network traffic manager 14 can establish a policy such as prioritizing requests originating from specified internet protocol (IP) addresses, prioritizing requests based on specified file extensions of the requested content, and/or prioritizing requests based on the type of client computing device 12 or user agent indicated in one or more of the HTTP headers associated with the request, for example. Any number and type of queue management rules for determining which existing request is to be removed from the request queue are possible and the queue management rules can each be associated with a priority value such that the highest priority queue management rule identifying an existing request will be used to remove, at step 44, the identified request.

In another example, the priority of each request is quantified by the network traffic management apparatus 14 which is configured to apply a plurality of scoring rules stored in the memory 20. In this example, the network traffic management apparatus 14 is configured to generate a score, at step 46, based on the plurality of scoring rules, for each current request prior to its insertion into the request queue at step 48.

Each of the scoring rules can be configured to assign one or more values based on one or more of attributes of the current request.

In one example, a scoring rule can assign a relatively low value of three to the current request because it originated from a relatively important specified IP address and another scoring rule can assign a relatively high value of ten to the current request, for a total score of thirteen, because the current request is for content having a PHP extension and likely to result in further request when serviced.

Accordingly, in this example, the network traffic management apparatus 14 can include at least one queue management rule configured to identify an existing request having the highest score to be removed from the request queue, at step 44, when the network traffic management apparatus 14 determines one or more existing requests should be removed, at step 42. The queue management rule is configured to identify an existing request with the highest score assuming, in this example, a policy has been established that one or more originating IP addresses are relatively important but also that network congestion should be aggressively reduced at the expense of requests for content likely to lead to more requests. Any number and type of scoring rules based on any attribute of a current request are possible.

Optionally, in one example, the queue management rule configured to identify an existing request to remove from the request queue based on score can operate in combination with other queue management rules configured to identify one or more existing requests irrespective of any score. In this example, the application of the various queue management rules can be determined by a priority value associated with each of the queue management rules such that the queue management rule having the highest priority value will be applied at step 44. In one example, higher priority queue management rules can be established to identify a specific existing request but, if no existing request is identified by such queue management rules, the network traffic management apparatus 14 can default to a lower priority queue management rule configured to identify an existing request based on score.

At step 46, the network traffic management apparatus 14 optionally generates a score for the current request by applying one or more scoring rules based on one or more attributes of the current request, although other manners for assigning a score could be used. At step 48, the network traffic management apparatus 14 adds the current request to the request queue as associated with the score generated at step 46. Because one or more existing requests were removed at step 44, in this example, there will necessarily be available space in the request queue for the current request to be inserted at step 48.

If back at step 42, the network traffic management apparatus 14 determines that an existing request is not to be removed from the request queue, then the No branch is taken to step 50. At step 50, the network traffic management apparatus 14 determines whether the request queue has capacity to receive the current request. The determination can be based on a default threshold utilization value, a threshold utilization value defined by an administrator of the network traffic management apparatus 14, and/or a threshold utilization value learned by the network traffic management apparatus 14 over time, for example, although any other parameters may be used to determine request queue capacity. The network traffic management apparatus 14 may determine an existing request should not be removed, at step 42, but that the request queue does not have capacity at step 50, such as when a policy is established that the most recently received requests should be dropped when request queue utilization is above a specified threshold utilization value, for example. Accordingly, if at step 50 the network traffic management apparatus 14 determines that the request queue does not have capacity to receive the current request, then the No branch is taken to step 53 where the current request is dropped.

At any time prior to and/or upon adding, at step 48, and/or dropping, at step 52, the current request, the network traffic management apparatus 14 can return to step 36 as described earlier to process the next obtained request. Meanwhile, at step 54, the network traffic management apparatus 14 also asynchronously services the existing requests stored in the request queue, such as according to the order in which the existing requests were added to the request queue, for example, from one or more of the servers 16.

If at step 50 the network traffic management apparatus 14 determines that the request queue does have capacity, then the Yes branch is taken to step 46 as described earlier. Accordingly, a score for the current request is generated at step 46, based on one or more scoring rules, and the current request is added, at step 48, to the request queue as associated with the generated score, as described and illustrated earlier.

In examples in which an existing request is removed from the request queue by the network traffic management apparatus 14, at step 44, and/or the current request is dropped by the network traffic management apparatus 14, at step 52, the connection associated with the removed or dropped request can be closed, an error code can be communicated to the originating client computing device 12, and/or an alternate version of the requested content can be communicated to the originating client computing device 12.

Accordingly, in one example, the network traffic management apparatus 14 sends to the originating client computing device 12 an HTML page indicating that the website is busy and requesting the user of the client computing device 12 try again later. Such as message may reduce the number of user refreshes and/or manual retransmissions of requests for the content associated with the removed or dropped request, thereby reducing network congestion and associated number of removed and/or dropped requests.

As described herein, this technology provides policy-based management of HTTP requests by a network traffic management apparatus 14 by establishing a request queue, to receive requests that would otherwise be dropped when network congestion and/or server utilization is high. The policy is implemented by one or more queue management rules configured to identify an existing request to drop from the queue, when necessary. Some or all of the queue management rules can identify an existing request according to a score associated with each existing request, the score being established based on one or more scoring rules and reflecting a weighted value or priority. With this technology HTTP requests are not dropped randomly when the network is congested but rather are removed from a request queue based on an established policy to thereby optimize utilization of the network and/or server resources and improve user experience.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for policy-based network traffic queue management, comprising:
    determining, by a network traffic management apparatus, when an Hypertext Transfer Protocol (HTTP) request queue should be dequeued based on one or more queue management rules and in response to receiving a current HTTP request from a client computing device:
    identifying, by the network traffic management apparatus, one of a plurality of existing HTTP requests stored in the request queue based at least in part on a utilization level of the request queue and a score associated with each of the existing requests, wherein the utilization level is less than full utilization and the score is generated based on a type of content associated with each of the existing requests, and removing, the existing request from the request queue, when the determining indicates that the request queue should be dequeued;
    generating, by the network traffic management apparatus, another score for the current request based at least in part on another type of additional content associated with the current request; and
    inserting, by the network traffic management apparatus, the current request into the request queue as associated with the another score.

2. The method as set forth in claim 1 wherein the queue management rules defined based at least in part on historical information regarding one or more users or one or more network addresses, the requested content, or one or more request attributes selected from a network address, an associated user, a content type, whether servicing is likely to result in one or more related requests, a uniform resource identifier (URI) of associated content, one or more associated cookies, information regarding associated content stored in cache, or one or more associated Hypertext Transfer Protocol (HTTP) header values.

3. The method as set forth in claim 1 further comprising:
    updating, by the network traffic management apparatus, performance information selected from a number of requests received from a user associated with the current request, a number of requests received from a network address associated with the current request, or a number of requests received for the content; and
    generating, by the network traffic management apparatus, one or more of the queue management rules based at least in part on the performance information.

4. The method as set forth in claim 1 wherein one or more of the queue management rules are established by a manufacturer of the traffic management apparatus, configured by an administrator of the traffic management apparatus, or learned by the traffic management apparatus.

5. The method as set forth in claim 1 further comprising:
    determining, by the network traffic management apparatus, when the request queue is empty and at least one server is available; and
    servicing, by the network traffic management apparatus, the current request without removing the existing request when the determining indicates that the queue is empty and at least one server is available.

6. The method as set forth in claim 1 further comprising:
    determining, by the network traffic management apparatus, when the request queue has capacity when the determining indicates that the request queue should not be dequeued;

inserting, by the network traffic management apparatus, the current request into the request queue when the determining indicates that the request queue has capacity;

dropping, by the network traffic management apparatus, the current request when the determining indicates that the request queue does not have capacity; and asynchronously servicing, by the network traffic management apparatus, the existing requests according to the order in which the existing requests were added to the request queue.

7. The method as set forth in claim 6 wherein one or more of the removing the existing request from the request queue or the dropping the current request further comprises closing a connection associated with the existing request, communicating an error code to the client computing device, or communicating an alternate version of the content to the client computing device.

8. A non-transitory computer readable medium having stored thereon instructions for policy-based network traffic queue management comprising executable code which when executed by at least one processor, causes the processor to perform steps comprising:

determining when an Hypertext Transfer Protocol (HTTP) request queue should be dequeued based on one or more queue management rules and in response to receiving a current HTTP request from a client computing device;

identifying one of a plurality of existing HTTP requests stored in the request queue based at least in part on a utilization level of the request queue and a score associated with each of the existing requests, wherein the utilization level is less than full utilization and the score is generated based on a type of content associated with each of the existing requests, and removing the existing request from the request queue, when the determining indicates that the request queue should be dequeued;

generating another score for the current request based at least in part on another type of additional content associated with the current request; and inserting the current request into the request queue as associated with the another score.

9. The medium as set forth in claim 8 wherein the queue management rules are defined based at least in part on historical information regarding one or more users or one or more network addresses, the requested content, or one or more request attributes selected from a network address, an associated user, a content type, whether servicing is likely to result in one or more related requests, a uniform resource identifier (URI) of associated content, one or more associated cookies, information regarding associated content stored in cache, or one or more associated Hypertext Transfer Protocol (HTTP) header values.

10. The medium as set forth in claim 8 wherein the executable code when executed by the at least one processor cause the processor to perform at least one additional step comprising:

updating performance information selected from a number of requests received from a user associated with the current request, a number of requests received from a network address associated with the current request, or a number of requests received for the content; and generating one or more of the queue management rules based at least in part on the performance information.

11. The medium as set forth in claim 8 wherein one or more of the queue management rules are established by a manufacturer, configured by an administrator, or learned.

12. The medium as set forth in claim 8 wherein the executable code when executed by the at least one processor cause the processor to perform at least one additional step comprising:

determining when the request queue is empty and at least one server is available; and servicing the current request without removing the existing request when the determining indicates that the queue is empty and at least one server is available.

13. The medium as set forth in claim 8 wherein the executable code when executed by the at least one processor cause the processor to perform at least one additional step comprising:

determining when the request queue has capacity when the determining indicates that the request queue should not be dequeued;

inserting the current request into the request queue when the determining indicates that the request queue has capacity;

dropping the current request when the determining indicates that the request queue does not have capacity; and asynchronously servicing the existing requests according to the order in which the existing requests were added to the request queue.

14. The medium as set forth in claim 13 wherein one or more of the removing the existing request from the request queue or the dropping the current request further comprises closing a connection associated with the existing request, communicating an error code to the client computing device, or communicating an alternate version of the content to the client computing device.

15. A network traffic management apparatus comprising a processor and memory coupled to the processor which is configured to be capable of executing programmed instructions comprising and stored in the memory to:

determine when an Hypertext Transfer Protocol (HTTP) request queue should be dequeued based on one or more queue management rules and in response to receiving a current HTTP request from a client computing device:

identify one of a plurality of existing HTTP requests stored in the request queue based at least in part on a utilization level of the request queue and a score associated with each of the existing requests, wherein the utilization level is less than full utilization and the score is generated based on a type of content associated with each of the existing requests, and remove the existing request from the request queue, when the determining indicates that the request queue should be dequeued;

generate another score for the current request based at least in part on another type of additional content associated with the current request; and insert the current request into the request queue as associated with the another score.

16. The apparatus as set forth in claim 15 wherein the queue management rules are defined based at least in part on historical information regarding one or more users or one or more network addresses, the requested content, or one or more request attributes selected from a network address, an associated user, a content type, whether servicing is likely to result in one or more related requests, a uniform resource identifier (URI) of associated content, one or more associated cookies, information regarding associated content stored in cache, or one or more associated Hypertext Transfer Protocol (HTTP) header values.

17. The apparatus as set forth in claim 15 wherein the processor coupled to the memory is further configured to be capable of executing at least one additional programmed instruction comprising and stored in the memory to:

update performance information selected from a number of requests received from a user associated with the current request, a number of requests received from a network address associated with the current request, or a number of requests received for the content; and generate one or more of the queue management rules based at least in part on the performance information.

18. The apparatus as set forth in claim 15 wherein one or more of the queue management rules are established by a manufacturer of the traffic management apparatus, configured by an administrator of the traffic management apparatus, or learned by the traffic management apparatus.

19. The apparatus as set forth in claim 15 wherein the processor coupled to the memory is further configured to be capable of executing at least one additional programmed instruction comprising and stored in the memory to:

determine when the request queue is empty and at least one server is available; and service the current request without removing the existing request when the determining indicates that the queue is empty and at least one server is available.

20. The apparatus as set forth in claim 15 wherein the processor coupled to the memory is further configured to be capable of executing at least one additional programmed instruction comprising and stored in the memory to:

determine when the request queue has capacity when the determining indicates that the request queue should not be dequeued;

insert the current request into the request queue when the determining indicates that the request queue has capacity;

drop the current request when the determining indicates that the request queue does not have capacity; and asynchronously service the existing requests according to the order in which the existing requests were added to the request queue.

21. The apparatus as set forth in claim 20 wherein one or more of the removing the existing request from the request queue or the dropping the current request further comprises closing a connection associated with the existing request, communicating an error code to the client computing device, or communicating an alternate version of the content to the client computing device.

* * * * *